(12) United States Patent
Kirby et al.

(10) Patent No.: US 11,773,734 B2
(45) Date of Patent: Oct. 3, 2023

(54) LIQUID BOND COATINGS FOR BARRIER COATINGS

(71) Applicant: General Electric Company, Schenectady, NY (US)

(72) Inventors: Glen Harold Kirby, Liberty Township, OH (US); Suresh Subramanian, Clifton Park, NY (US); Suresh Viswanathan, Mason, OH (US); James Dale Steibel, Mason, OH (US)

(73) Assignee: General Electric Company, Schenectady, NY (US)

( * ) Notice: Subject to any disclaimer, the term of this patent is extended or adjusted under 35 U.S.C. 154(b) by 447 days.

(21) Appl. No.: 15/697,913

(22) Filed: Sep. 7, 2017

(65) Prior Publication Data

US 2019/0071983 A1 Mar. 7, 2019

(51) Int. Cl.
*F01D 5/28* (2006.01)
*F01D 25/00* (2006.01)
(Continued)

(52) U.S. Cl.
CPC .......... *F01D 5/288* (2013.01); *C04B 41/009* (2013.01); *C04B 41/52* (2013.01); *C04B 41/89* (2013.01);
(Continued)

(58) Field of Classification Search
CPC ............... Y10T 428/23; Y10T 428/234; Y10T 428/236; Y10T 428/24479;
(Continued)

(56) References Cited

U.S. PATENT DOCUMENTS 5,419,927 A 5/1995 Dietrich
6,316,078 B1 * 11/2001 Smialek ................. C23C 4/02
428/172
(Continued)

FOREIGN PATENT DOCUMENTS

EP 1479659 A2 11/2004
EP 3037394 A1 * 6/2016 ............. C04B 41/89
(Continued)

OTHER PUBLICATIONS

Davis, J.R.. (1998). Metals Handbook, Desk Edition (2nd Edition)—Appendix 1: Melting and Boiling Points of the Elements at Atmospheric Pressure. ASM International. Retrieved from app.knovel.com/hotlink/pdf/id:kt010QT0Y1/metals-handbook-desk/appendices-melting-boiling (Year: 1998).*

(Continued)

*Primary Examiner* — Maria V Ewald
*Assistant Examiner* — Ethan A. Utt
(74) *Attorney, Agent, or Firm* — Dority & Manning, P.A.

(57) ABSTRACT

A coated component, along with methods of its formation and use, is provided. The coated component may include a substrate having a surface with a plurality of cavities defined therein, a bond coating (e.g., including a silicon material) on the surface of the substrate within the cavities, and an environmental barrier coating over the surface of the substrate and encasing the bond coating within the cavities such that the bond coating, when melted, is contained within the cavities. Such a coated component may be, in one embodiment, a turbine component, such as a CMC component for use in a hot gas path of a gas turbine engine.

19 Claims, 5 Drawing Sheets

(51) Int. Cl.
*F01D 9/04* (2006.01)
*F23R 3/00* (2006.01)
*C04B 41/00* (2006.01)
*C04B 41/52* (2006.01)
*C04B 41/89* (2006.01)

(52) U.S. Cl.
CPC .............. *F01D 5/282* (2013.01); *F01D 9/04* (2013.01); *F01D 25/005* (2013.01); *F23R 3/007* (2013.01); *F05D 2220/32* (2013.01); *F05D 2230/90* (2013.01); *F05D 2240/11* (2013.01); *F05D 2240/35* (2013.01); *F05D 2250/181* (2013.01); *F05D 2250/184* (2013.01); *F05D 2250/294* (2013.01); *F05D 2260/204* (2013.01); *F05D 2300/222* (2013.01); *F05D 2300/6033* (2013.01); *F23R 2900/00018* (2013.01)

(58) Field of Classification Search
CPC ..... Y10T 428/24521; Y10T 428/24537; Y10T 428/24545; Y10T 428/24562; Y10T 428/2457; Y10T 428/24587; Y10T 428/24612; Y10T 428/2462; Y10T 428/31678; Y10T 428/24802; Y10T 428/24826; Y10T 428/24851; Y10T 428/24917; Y10T 428/24926; Y10T 428/24355; Y10T 428/24364; Y10T 428/24471; Y10T 428/24942; Y10T 428/2495; Y10T 428/24959; Y10T 428/24967; Y10T 428/24975; Y10T 428/24983; Y10T 428/24992; Y10T 428/26; Y10T 428/263; Y10T 428/264; Y10T 428/265; Y10T 428/266; Y10T 428/268; Y10T 428/27; Y10T 428/273; Y10T 428/31663; Y10T 428/31667; Y10T 428/239; B32B 3/00; B32B 3/02; B32B 3/04; B32B 3/26; B32B 3/263; B32B 3/30; B32B 9/00; B32B 9/04; B32B 9/041; B32B 9/047; B32B 15/00; B32B 15/04; B32B 15/14; B32B 18/00; B32B 3/10; B32B 3/18; B32B 3/20; B32B 3/22; B32B 7/00; B32B 7/04; B32B 7/045; B32B 7/12; B32B 7/14; B32B 3/12; B32B 7/02; B32B 7/022; B32B 7/027; B32B 7/05; B32B 2603/00; B32B 27/00; B32B 27/02; B32B 27/04; B32B 27/06; B32B 27/08; B32B 27/12; B32B 27/28; B32B 27/283; B32B 25/00; B32B 25/04; B32B 25/08; B32B 25/10; B32B 25/20; C09J 143/00; C09J 143/04; C09J 183/00; C09J 183/02; C09J 183/04; C09J 183/06; C09J 183/08; C09J 183/10; C09J 183/12; C09J 183/14; C09J 183/16
USPC ..... 428/62, 72, 73, 156, 161, 163, 164, 166, 428/167, 169, 172, 173, 688, 689, 428/697–702, 450, 457, 469, 472, 472.1, 428/195.1, 198, 201, 209, 210, 141, 142, 428/155, 212–220, 332, 334–338, 340, 428/341, 446–448, 451, 76
See application file for complete search history.

(56) References Cited

U.S. PATENT DOCUMENTS

| | | | |
|---|---|---|---|
| 6,398,991 B1 | 6/2002 | Brazil et al. | |
| 6,514,629 B1 | 2/2003 | Rigney et al. | |
| 6,893,750 B2 | 5/2005 | Nagaraj et al. | |
| 6,902,836 B2 | 6/2005 | Eaton et al. | |
| 6,929,851 B1 | 8/2005 | Leverenz et al. | |
| 6,974,619 B2 | 12/2005 | Manoharan et al. | |
| 7,060,360 B2 | 6/2006 | Eaton et al. | |
| 7,763,356 B2 | 7/2010 | Berczik et al. | |
| 7,989,020 B2 | 8/2011 | Strangman et al. | |
| 8,440,314 B2 | 5/2013 | Morton et al. | |
| 8,722,202 B2 | 5/2014 | Nagaraj et al. | |
| 9,359,505 B2 | 6/2016 | Ii et al. | |
| 9,512,505 B2 | 12/2016 | Weaver et al. | |
| 2004/0234783 A1 | 11/2004 | Eaton et al. | |
| 2005/0048305 A1 | 3/2005 | Ackerman et al. | |
| 2005/0214563 A1 | 9/2005 | Feng et al. | |
| 2010/0080984 A1 | 4/2010 | Lee | |
| 2011/0116920 A1* | 5/2011 | Strock | C23C 28/00 428/172 |
| 2011/0300342 A1* | 12/2011 | Lutjen | F01D 11/122 428/173 |
| 2013/0052415 A1* | 2/2013 | Burns | C04B 35/62222 428/141 |
| 2015/0070855 A1 | 3/2015 | Miyao et al. | |
| 2015/0197456 A1* | 7/2015 | Oboodi | C04B 41/89 428/172 |
| 2016/0017749 A1 | 1/2016 | Luthra et al. | |
| 2016/0024962 A1 | 1/2016 | Luthra | |
| 2016/0251272 A1* | 9/2016 | Weaver | C04B 35/62844 428/170 |
| 2016/0251970 A1* | 9/2016 | Strock | F01D 11/125 428/164 |
| 2016/0265367 A1 | 9/2016 | Rosenzweig et al. | |
| 2017/0073277 A1 | 3/2017 | Shim et al. | |
| 2018/0079689 A1 | 3/2018 | Kirby et al. | |

FOREIGN PATENT DOCUMENTS

| | | |
|---|---|---|
| EP | 3141631 A1 | 3/2017 |
| JP | 2010/156327 A | 7/2010 |
| JP | 2015/056501 A | 3/2015 |
| WO | WO2014/138108 A1 | 9/2014 |
| WO | WO2018/050084 A1 | 3/2018 |
| WO | WO2018/052739 A1 | 3/2018 |
| WO | WO2018/128676 A1 | 7/2018 |

OTHER PUBLICATIONS

Wasa, Kiyotaka Kitabatake, Makoto Adachi, Hideaki. (2004). Thin Film Materials Technology—Sputtering of Compound Materials—5.3 Carbides and Silicides. William Andrew Publishing/Noyes. Retrieved from app.knovel.com/hotlink/pdf/id:kt003HVRE2/thin-film-materials-technology/carbides-silicides (Year: 2004).*
Extended European Search Report and Opinion Corresponding to Application No. 18191157.9 dated Dec. 13, 2018.
Extended European Search Report and Opinion Corresponding to Application No. 18191162.9 dated Dec. 13, 2018.
Extended European Search Report and Opinion Corresponding to Application No. 18191166.0 dated Dec. 14, 2018.
United States Office Action Corresponding to Application No. 15697947 dated Jul. 15, 2019.
Machine Translated Japanese Office Action Corresponding to Application No. 2018165920 dated Dec. 26, 2019.

* cited by examiner

LIQUID BOND COATINGS FOR BARRIER COATINGS

FIELD

The present invention generally relates to bond coatings for use with environmental barrier coatings on ceramic components, along with methods of their formation and use.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from super alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide. To prevent recession in moist, high temperature environments, environmental barrier coatings (EBC's) are deposited onto silicon carbide and silicon nitride materials.

Currently, EBC materials are made out of rare earth silicate compounds. These materials seal out water vapor, preventing it from reaching the silicon oxide scale on the silicon carbide or silicon nitride surface, thereby preventing recession. Such materials cannot prevent oxygen penetration, however, which results in oxidation of the underlying substrate. Oxidation of the substrate yields a passive silicon oxide scale, along with the release of carbonaceous or nitrous oxide gas. The carbonaceous (i.e., $CO$, $CO_2$) or nitrous (i.e., $NO$, $NO_2$, etc.) oxide gases cannot escape out through the dense EBC and thus, blisters form. The use of a silicon bond coating has been the solution to this blistering problem to date. The silicon bond coating provides a layer that oxidizes (forming a passive silicon oxide layer beneath the EBC) without liberating a gaseous by-product.

However, the presence of a silicon bond coating limits the upper temperature of operation for the EBC because the melting point of silicon metal is relatively low. In use, the silicon bond coating melts at coating temperatures of about 1414° C., which is the melting point of silicon metal. Above these melting temperatures, the silicon bond coating may delaminate from the underlying substrate, effectively removing the bond coat and the EBC thereon. As such, it is desirable to improve the properties of a silicon bond coating in the EBC to achieve a higher operational temperature limit for the EBC.

BRIEF DESCRIPTION

Aspects and advantages of the invention will be set forth in part in the following description, or may be obvious from the description, or may be learned through practice of the invention.

A coated component is generally provided, along with methods of its formation and use. In one embodiment, the coated component includes a substrate having a surface with a plurality of cavities defined therein, a bond coating (e.g., including a silicon material) on the surface of the substrate within the cavities, and an environmental barrier coating over the surface of the substrate and encasing the bond coating within the cavities such that the bond coating, when melted, is contained within the cavities.

Such a coated component may be, in one embodiment, a turbine component, such as a CMC component for use in a hot gas path of a gas turbine engine.

Methods are also generally provided for forming a coated component. In one embodiment, the method includes forming a plurality of cavities within a surface of a substrate; forming a bond coating of a silicon material within the cavities, and forming an environmental barrier coating over the surface of the substrate and encasing the bond coating within the cavities such that the bond coating, when melted, is contained within the cavities.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

A coated component is generally provided that includes a bond coating positioned within cavities defined within the surface of the substrate and under an environmental barrier coating (EBC) thereon. Generally, the bond coating is formed from a silicon material, such as silicon metal, a silicide having a relatively low melting point (e.g., 1500° C. or less), etc. As explained in greater detail below, the silicon material of the bond coating may melt during operation of the coated component, while remaining contained within the cavities defined within the surface of the substrate by the EBC thereon. The bond coating may, in certain embodiments, retain its functions, such as bonding the substrate to the EBC thereon and gettering of oxygen without releasing gas to prevent oxidation of the underlying substrate that would otherwise result in a gaseous by-product. Thus, a liquid bond coating may be utilized during operation of the coating component (e.g., within a gas turbine engine). Since the bond coating continues to function above the melting point of the silicon material, the coated component can be operated at temperatures above the melting point of the silicon material.

Figure 1A:
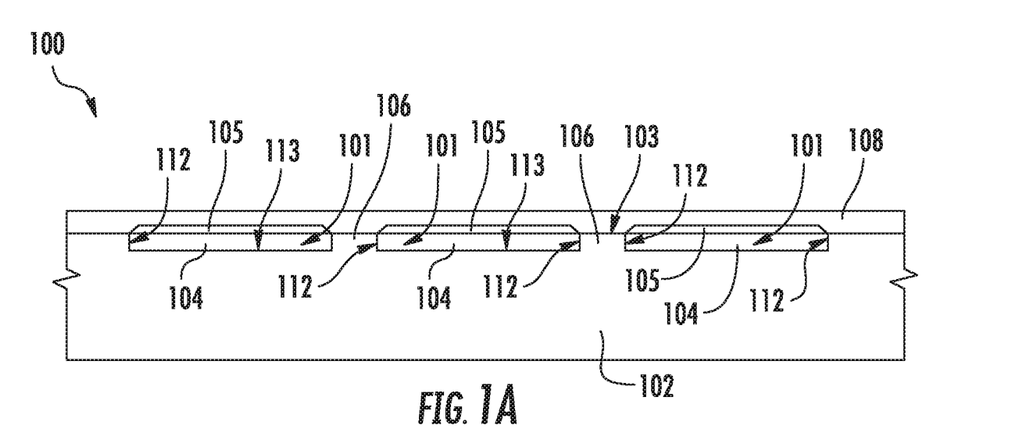
FIG. 1A is a cross-sectional side view of an exemplary coated component having an encapsulated bond coating.
Figure 1B:
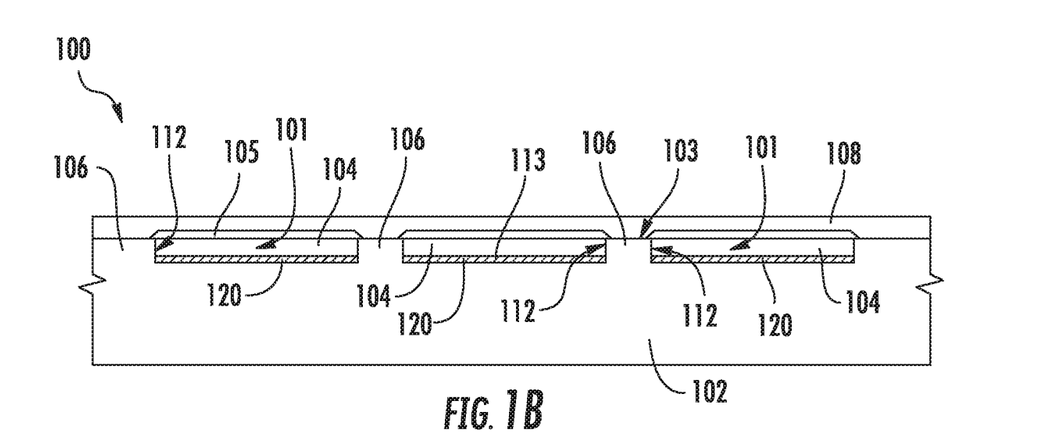
FIG. 1B is a cross-sectional side view of another exemplary coated component having an encapsulated bond coating.
Figure 2A:
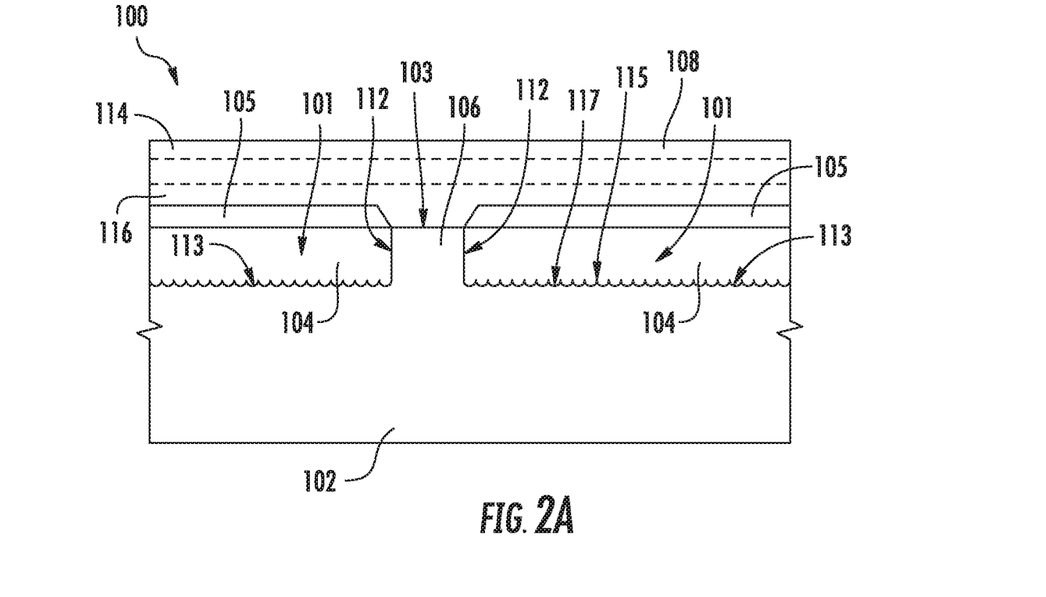
FIG. 2A is an exploded cross-sectional side view of an exemplary coated component having an encapsulated bond coating, such as shown in FIG. 1A.
Figure 2B:
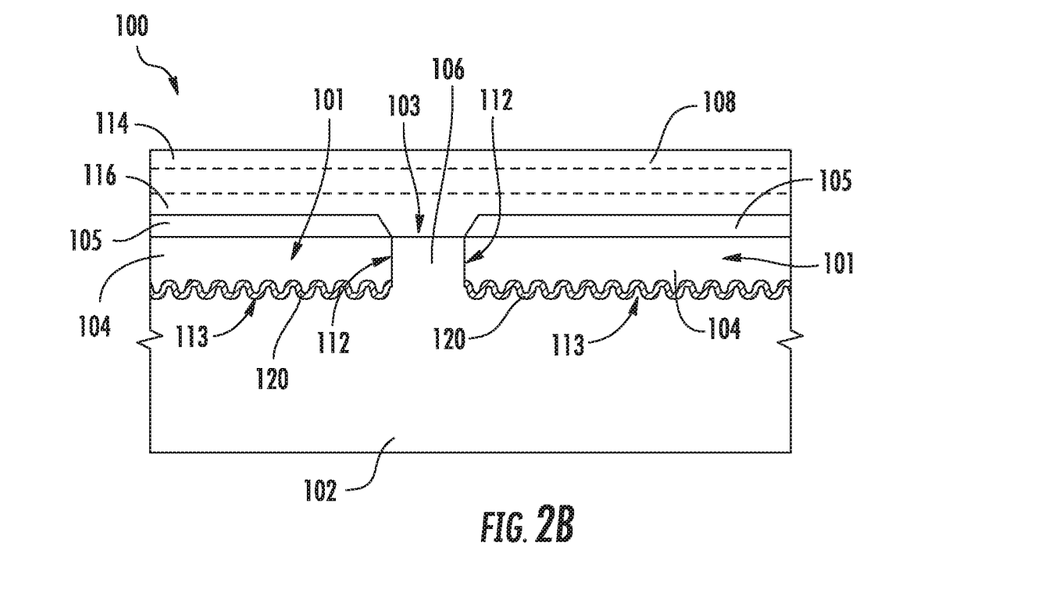
FIG. 2B is an exploded cross-sectional side view of another exemplary coated component having an encapsulated bond coating, such as shown in FIG. 1B.

Referring to FIGS. 1A, 1B, 2A and 2B, an exemplary coated component 100 is shown formed from a substrate 102 having a surface 103 that defines a plurality of cavities 101 therein. Each of the cavities 101 contains a bond coating 104, which may include a silicon material. In the embodiments shown in FIGS. 1A and 2A, the bond coating 104 is directly on the surface 103 without any layer therebetween. However, in other embodiments, one or more layers can be positioned between the bond coating 104 and the surface 103. For example, FIGS. 1B and 2B show a boundary layer 120, as discussed in greater detail below, positioned between the bond coating 104 is directly on the surface 103 of the substrate 102.

In one particular embodiment, the silicon material of the bond coating 104 may be formed from silicon metal, a silicon alloy (e.g., a silicon eutectic alloy), a silicide with a melting point of about 1500° C. or less, or mixtures thereof. The silicon material may exhibit good wetting with the substrate 102 itself, or the substrate 102 may be chemically modified to promote wetting (e.g., by the inclusion of a boundary layer 120 on the substrate 102). As such, the silicon material of the bond coating 104 may melt at temperatures of about 1400° C. or greater, depending on the composition of the silicon material, so as to become molten. For example, the silicon material of the bond coating 104 may have at a melting temperature of about 1414° C. to about 1760° C. (e.g., about 1414° C. to about 1485° C.). In particular embodiments, the silicon material that is molten at a bond coating temperature of 1415° C., 1425° C., 1450° C., 1475° C., and/or 1500° C.

In particular embodiments, for example, the silicon material of the bond coating 104 may include at least about 50% by weight of silicon metal, such as about 75% to 100% by weight of silicon metal. Pure silicon metal has a melting point of about 1414° C. As such, the silicon material of the bond coating 104 may melt at temperatures of about 1414° C. or greater, depending on the composition of the silicon material, so as to become molten.

In certain embodiments, a silicide having a melting point of about 1500° C. or less (e.g., about 1400° C. to about 1500° C.) may also be in the bond coating 104. Determining the melting point of a particular silicide may be easily achieved using Si phase diagrams. Particularly suitable silicides may include a rare earth and silicon so as to be compatible with the refractory material and/or the EBC material. For example, silicides having a melting point of about 1500° C. or less may include, in one particular embodiment, $Si_{1-x}Y_x$ where x is greater than 0 to about 0.25.

The adjacent cavities 101 may be separated from each other (i.e., isolated from each other) with the surface 103 by ridges 106 having side walls 112 facing the cavity 101. As such, the walls 112 of the cavity 101 work with the surface 103 of the substrate 102 and the environmental barrier coating 108 (and particularly a hermetic layer therein) to contain the melted silicon material of the bond coating 104 therein while keeping the integrity of the bond coating 104 without delamination from the surface 103 of the substrate 102.

Generally, the bond coating 104 is relatively thin. In one particular embodiment, the bond coating 105 has a thickness that is equal to or less than the wall height of the wall 112 such that the bond coating 104 does not extend out of the cavity 101. For example, the bond coating 105 may have a thickness that is about 90% to 100% of the wall height of the wall 112 (e.g., about 95% to 100% of the wall height). In certain embodiments, the walls 112 may have a wall height that is about 25 micrometers (μm) to about 275 μm, such as about 25 μm to about 150 μm (e.g., about 25 μm to about 100). Similarly, the bond coating 104 may have a thickness that is about 25 μm to about 275 μm, such as about 25 μm to about 150 μm (e.g., about 25 μm to about 100).

As shown in FIGS. 2A and 2B, a bottom surface 113 within the cavity 101 between opposing side walls 112 is defined by the substrate 102. Together with the overlying EBC 108, the side walls 112 and the bottom surface 113 encapsulate the bond coating 104 such that, upon melting, the silicon material is contained within the cavity. In one embodiment, the bottom surface 113 may include a surface feature that increases the contact surface area between the bond coating 104 and the substrate 102. For example, the bottom surface 113 may include a series of alternating peaks 115 and valleys 117. Similarly, the side walls 112 may include such surface features.

FIGS. 1B and 2B show an exemplary coated component 100 that includes a boundary layer 120 that inhibits interaction between the melted bond coating 101 and the underlying substrate 102. For example, the boundary layer 120 may be positioned between the silicon-based bond coating 101 and the surface 113 of the substrate 102 within the cavities 101 such that, during operation at temperatures that melt the silicon material of the bond coating 104, the boundary layer 120 may protect the underlying substrate 102 from reaction with the molten material (e.g., molten silicon). For example, when Si metal is included within the bond coating 104, a liquid Si metal may dissolve silicon carbide in the substrate 102. Such an interaction between the liquid silicon material and the substrate may be inhibited through the presence of the boundary layer 120. Generally, the boundary layer 120 is relatively thin so as to allow for the silicon material of the bond coating 104 to at least partially perform its bonding function with the underlying substrate 102, while remaining sufficiently thick to protect the substrate 102 from reaction with molten silicon material during use at such temperatures. In particular embodiments, the boundary layer 120 may have a thickness that is about 5 micrometers (μm) to about 100 μm, such as about 10 μm to about 50 μm.

Generally, the boundary layer 120 includes a refractory material that has a melting point that is greater than that of the silicon material of the bond coating 104 (e.g., about 1500° C. or greater) while being compatible with the material of the substrate 102 and while being unreactive with the silicon material of the bond coating 104. In certain embodiments, the refractory material may wet the silicon material of the bond coating 104. For example, the refractory material of the boundary layer 120 may include any suitable refractory material, including but not limited to, rare earth silicates (e.g., rare earth disilicates, rare earth monosilicates, or mixtures thereof), rare earth gallium oxides, hafnium oxide, tantalum oxide, niobium oxide, silicides having a melting point of about 1500° C. or greater (e.g., $Mo_5Si_3$, $MoSi_2$, $ReSi_2$, $ReSi$, $WSi_2$, $W_5Si_3$, $CrSi_2$, rare earth silicides, or mixtures thereof), silicon oxide, or mixtures thereof. In particular embodiments, the refractory material of the boundary layer 120 may be doped with boron, gallium, aluminum, or another dopant.

Figure 3:
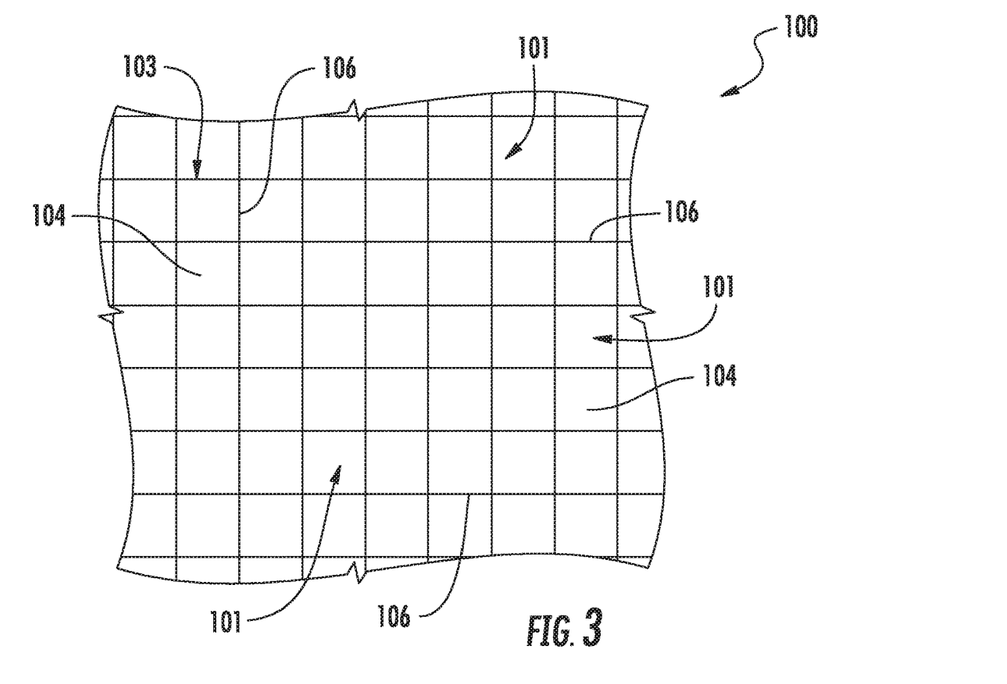
FIG. 3 is a top-down view of an exemplary substrate having an encapsulated bond coating, such as shown in FIGS. 1A, 1B, 2A and 2B.
Figure 4:
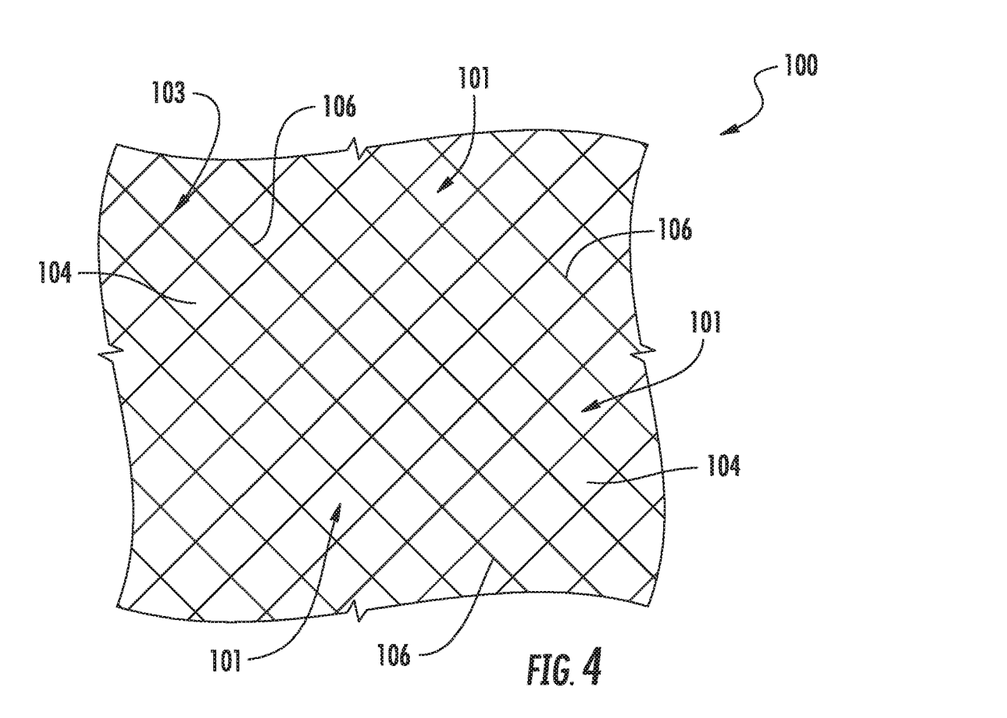
FIG. 4 is a top-down view of another exemplary substrate having an encapsulated bond coating, such as shown in FIGS. 1A, 1B, 2A and 2B.

As shown in FIGS. 3-4, the ridges 106 may form a pattern, such as a continuous pattern on the surface (e.g., a square grid shown in FIG. 3 or a diamond grid shown in FIG. 4), which may have any desired shape over the surface 103 of the substrate 102. In particular embodiments, the pattern may cover the entire surface 103 of the substrate 102, particularly when the surface 103 faces a hot gas path on an engine component.

No matter the particular pattern formed by the ridges 106, a great majority of the surface area of the surface 103 on the substrate 102 is defined by the cavities 106, while the ridges 106 define a relatively small portion of the surface area of the surface 103. Thus, the bond coating 104 may contact a great majority of the inner surface of the overlying EBC 108, with only a small amount of the surface 103 being bonded directly to the EBC 108 without any bond material therebetween. However, the ridges 106 provide a sufficient surface area for bonding to the inner surface of the EBC 108 when the material of the bond coating 104 is melted. For example, the cavities may define about 90% to less than 100% of the total surface area of the surface 103 on the substrate 102, such as about 95% to less than 100% (e.g., about 98% to less than 100%). Conversely, the ridges 106 may define greater than 0% to about 10% of the total surface area of the surface 103 on the substrate 102, such as greater than 0% to about 5% (e.g., greater than 0% to about 2%).

In certain embodiments, the ridges 106 may have a width of about 10 μm μm to about 3 millimeter (mm) to provide a sufficient surface area to bond with the overlying EBC 108 while remaining thin enough such that blistering (e.g., through oxidation of the underlying substrate 102) does not occur in a detrimental amount.

FIGS. 1 and 2 show a thermally grown oxide ("TGO") layer 105, which may form on the surface of the bond coating 104, such as a layer of silicon oxide (sometimes referred to as "silicon oxide scale" or "silica scale"), during exposure to oxygen (e.g., during manufacturing and/or use) of the component 100. In one embodiment, at least a portion of the ridges 106 may bond directly to the surface 103 of the substrate 102 without any other layer therebetween. However, in alternative embodiments, the ridges 106 may have a width that is small enough to allow the TGO layer 105 to migrate and extend over the ridge 106 between adjacent bond coatings 104.

As stated above, the bond coating 104 may be used in conjunction with an EBC 108 to form a coated component 100 with an increased operating temperature compared to that using a uniformly applied silicon bond coating (without the cavities 101). The EBC 108 may include any combination of one or more layers formed from materials selected from typical EBC or thermal barrier coating ("TBC") layer chemistries, including but not limited to rare earth silicates (e.g., mono-silicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc.

The EBC 108 may be formed from a plurality of individual layers 114. In the embodiment shown in FIGS. 2A and 2B, EBC 108 includes a hermetic layer 116 positioned in directly on the bond coating 104 so as to encase the silicon material, upon melting, within the cavity 101. However, in other embodiments, the hermetic layer 116 may be positioned elsewhere within the EBC 108.

Referring FIGS. 1 and 2, the substrate 102 may be formed from a ceramic matrix composite ("CMC") material, such as a silicon based, non-oxide ceramic matrix composite. As used herein, "CMC" refers to a silicon-containing, or oxide-oxide, matrix and reinforcing material. As used herein, "monolithic ceramics" refers to materials without fiber reinforcement (e.g., having the matrix material only). Herein, CMCs and monolithic ceramics are collectively referred to as "ceramics."

Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

The coated component 100 is particularly suitable for use as a component found in high temperature environments, such as those present in gas turbine engines, for example, combustor components, turbine blades, shrouds, nozzles, heat shields, and vanes. In particular, the turbine component can be a CMC component positioned within a hot gas flow path of the gas turbine such that the coating system (with the bond coating 104 and the EBC 108) forms an environmental barrier for the underlying substrate 102 to protect the component 100 within the gas turbine when exposed to the hot gas flow path.

Figure 5:
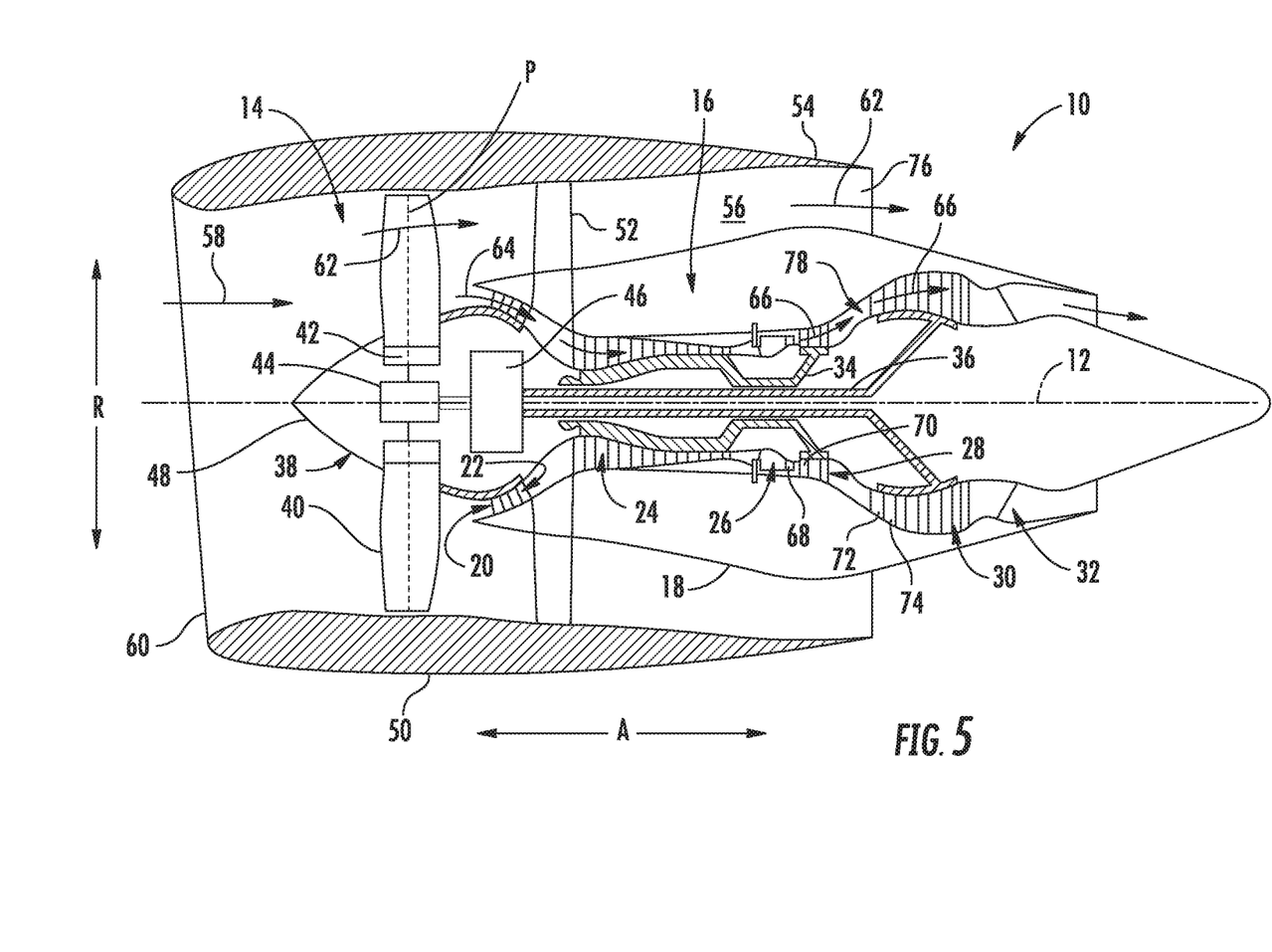
FIG. 5 is a schematic cross-sectional view of an exemplary gas turbine engine according to various embodiments of the present subject matter.

FIG. 5 is a schematic cross-sectional view of a gas turbine engine in accordance with an exemplary embodiment of the present disclosure. More particularly, for the embodiment of FIG. 5, the gas turbine engine is a high-bypass turbofan jet engine 10, referred to herein as "turbofan engine 10." As shown in FIG. 5, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 5, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 6:
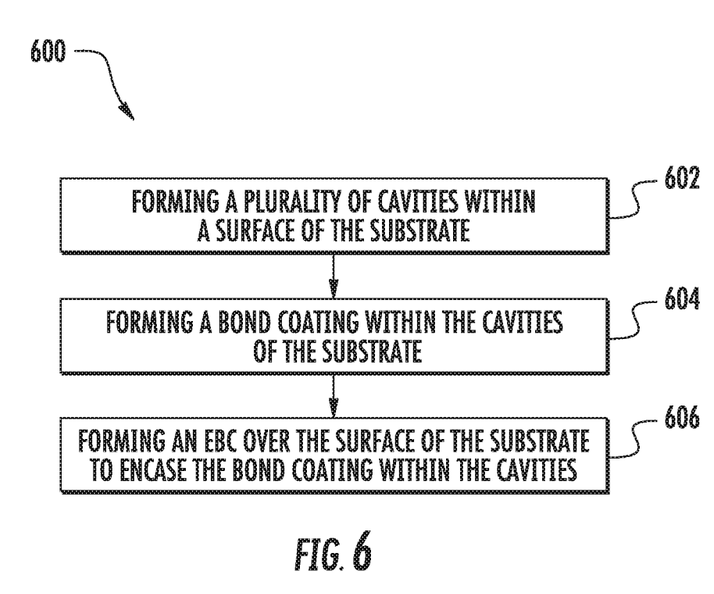
FIG. 6 is a diagram of an exemplary method of forming a bond coating with a silicon-phase contained within a continuous phase of a refractory phase.

Methods are also generally provided for coating a ceramic component. For example, FIG. 6 shows a diagram of an exemplary method 600 of forming a coating system on a surface of a substrate. At 602, a plurality of cavities are formed within a surface of the substrate. At 604, a bond coating is formed within the cavities of the substrate, and may include a silicon material (e.g., silicon metal). At 606, an environmental barrier coating (EBC) is formed over the surface of the substrate to encase the bond coating within the cavities. As described above, the bond coating, when melted, is contained within cavities between the substrate and an inner surface of the environmental barrier coating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component for a gas turbine engine comprising:
   a substrate having a surface, wherein a plurality of cavities are defined within the surface of the substrate;
   a bond coating on the surface of the substrate within the cavities defined within the surface of the substrate, wherein adjacent cavities are separated from each other by ridges on the surface of the substrate, wherein the bond coating comprises a silicon material having a melting point that is experienced within an operating temperature range of the gas turbine engine; and
   an environmental barrier coating comprising a plurality of layers positioned over the surface of the substrate and encasing the bond coating within the cavities such that the bond coating, when melted, is contained within the cavities, wherein the ridges are defined by areas where the surface of the substrate is bonded directly to the environmental barrier coating, and wherein at least one of the layers of the environmental barrier coating comprises a hermetic layer adjacent to the bond coating such that the hermetic layer defines an inner surface of the environmental barrier coating and encases the bond coating upon melting within the cavities.

2. The coated component as in claim 1, wherein the bond coating comprises silicon metal, a silicon alloy, a silicide with a melting point of about 1500° C. or less, or mixtures thereof.

3. The coated component as in claim 1, wherein the bond coating melts at temperatures of about 1400° C. or greater.

4. The coated component as in claim 1, wherein each cavity is defined by a plurality of side walls defined by the substrate, each side wall having a wall height, and wherein the bond coating has a thickness that is equal to or less than the wall height.

5. The coated component as in claim 4, wherein a bottom surface is defined by the substrate within each cavity and between opposing side walls, wherein at least one of the side walls and the bottom surface includes a series of alternating peaks and valleys to increase a contact surface area between the bond coating and the substrate.

6. The coated component as in claim 4, wherein a bottom surface is defined by the substrate within each cavity and between opposing side walls, wherein the bottom surface includes a series of peaks and valleys to increase a contact surface area between the bond coating and the substrate.

7. The coated component as in claim 4, wherein the bond coating has a thickness that is about 90% to 100% of the wall height.

8. The coated component as in claim 4, wherein the wall height that is about 25 micrometers (m) to about 275 μm, and wherein the bond coating has a thickness that is about 25 μm to about 275 μm.

9. The coated component as in claim 4, further comprising:
   a boundary layer extending over a bottom surface defined by the substrate within each cavity and between opposing side walls such that the boundary layer is between the bond coating and the substrate.

10. The coated component as in claim 9, wherein the boundary layer comprises a rare earth silicate, a rare earth gallium oxide, hafnium oxide, tantalum oxide, niobium oxide, a silicide having a melting point of about 1500° C. or greater, silicon oxide, or mixtures thereof.

11. The coated component as in claim 9, wherein the boundary layer has a thickness that is about 5 μm to about 100 μm.

12. The coated component as in claim 1, wherein a plurality of ridges defines a pattern on the surface of the substrate.

13. The coated component as in claim 1, wherein the surface of the substrate has a surface area, and wherein the ridges define greater than 0% to about 10% of the surface area of the substrate.

14. The coated component as in claim 1, wherein the surface of the substrate has a surface area, and wherein the ridges define greater than 0% to about 5% of the surface area of the substrate.

15. The coated component as in claim 1, wherein the ridges have a width of about 10 μm to about 3 mm.

16. The coated component as in claim 1, wherein the substrate comprises a ceramic matrix composite (CMC) comprising silicon carbide, silicon nitride, or a combination thereof, and wherein the substrate comprises a plurality of CMC plies.

17. The coated component as in claim 1, wherein a top surface of each ridge is bonded directly to the environmental barrier coating.

18. A turbine component for a gas turbine engine, comprising:
   a substrate comprising a ceramic matrix composite and having a surface, wherein a plurality of cavities are defined within the surface of the substrate;
   a bond coating on the surface of the substrate within the cavities defined within the surface of the substrate, wherein adjacent cavities are separated from each other by ridges on the surface of the substrate, wherein the bond coating comprises a silicon material having a melting point that is less than a melting point of the ceramic matrix composite, but is experienced within an operating temperature range of the gas turbine engine; and
   an environmental barrier coating comprising a plurality of layers positioned over the surface of the substrate and encasing the bond coating within the cavities such that the bond coating, when melted, is contained within the cavities, wherein the ridges are defined by areas where the surface of the substrate is bonded directly to the environmental barrier coating, and wherein at least one of the layers of the environmental barrier coating comprises a hermetic layer adjacent to the bond coating such that the hermetic layer defines an inner surface of the environmental barrier coating and encases the bond coating upon melting within the cavities.

19. A method of forming a coated component for a gas turbine engine, the method comprising:
   forming a plurality of cavities within a surface of a substrate, wherein adjacent cavities are separated from each other by ridges on the surface of the substrate;
   forming a bond coating within the cavities, wherein the bond coating comprises a silicon material having a melting point; and
   forming an environmental barrier coating comprising a plurality of layers wherein at least one of the layers of the environmental barrier coating comprises a hermetic layer adjacent to the bond coating such that the hermetic layer defines an inner surface of the environmental barrier coating, and wherein the environmental barrier coating is positioned over the surface of the substrate and encasing the bond coating within the cavities such that the bond coating, when melted, is contained within the cavities, wherein the environmental barrier coating is applied directly onto a top surface of the substrate on the ridges and on the bond coating over the cavities;

wherein the bond coating melts at a temperature that is within an operating temperature range of the gas turbine engine.

* * * * *